US006317484B1

United States Patent
McAllister

(10) Patent No.: US 6,317,484 B1
(45) Date of Patent: *Nov. 13, 2001

(54) PERSONAL TELEPHONE SERVICE WITH TRANSPORTABLE SCRIPT CONTROL OF SERVICES

(76) Inventor: Alexander I. McAllister, 1201 Godwin Dr., Silver Spring, MD (US) 20901

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/056,844

(22) Filed: Apr. 8, 1998

(51) Int. Cl.[7] ................................................. H04M 1/64
(52) U.S. Cl. ................................ 379/88.02; 379/88.04; 379/88.18; 379/201.02; 379/207.13
(58) Field of Search .......................... 379/88.02, 88.18, 379/88.22, 88.23, 88.24, 88.25, 88.26, 88.27, 207, 201, 210, 211, 212, 67.1, 88.01, 88.04, 220, 221

(56) References Cited

U.S. PATENT DOCUMENTS

| | | | |
|---|---|---|---|
| 4,313,035 | 1/1982 | Jordan et al. | 379/207 |
| 4,371,752 | 2/1983 | Matthews et al. | 379/88.26 |
| 4,585,906 | 4/1986 | Matthews et al. | 379/88.26 |
| 4,602,129 | 7/1986 | Matthews et al. | 379/88.26 |
| 4,625,081 | 11/1986 | Lotito | 379/88.26 |
| 4,899,373 | 2/1990 | Lee et al. | 379/207 |
| 4,933,967 | * 6/1990 | Lo et al. | 379/207 |
| 5,029,199 | 7/1991 | Jones et al. | 379/88.26 |
| 5,206,899 | 4/1993 | Gupta et al. | 379/120 |
| 5,247,571 | 9/1993 | Kay et al. | 379/207 |
| 5,329,578 | 7/1994 | Brennan et al. | 379/88.19 |
| 5,422,936 | 6/1995 | Atwell | 379/88.23 |
| 5,430,791 | 7/1995 | Feit et al. | 379/88.01 |
| 5,465,290 | 11/1995 | Hampton et al. | 379/88.02 |
| 5,515,426 | 5/1996 | Yacenda et al. | 379/201 |
| 5,572,583 | 11/1996 | Wheeler, Jr. et al. | 379/207 |
| 5,583,920 | * 12/1996 | Wheeler, Jr. | 379/88.01 |
| 5,586,177 | 12/1996 | Farris et al. | 379/230 |
| 5,661,782 | 8/1997 | Bartholomew et al. | 379/88.18 |
| 5,661,791 | 8/1997 | Parker | 379/211 |
| 5,680,442 | 10/1997 | Bartholomew et al. | 379/88.26 |
| 5,719,921 | 2/1998 | Vysotsky et al. | 379/88.01 |
| 5,751,792 | * 5/1998 | Chau et al. | 379/88.17 |
| 5,761,290 | 6/1998 | Farris et al. | 379/207 |
| 5,771,276 | * 6/1998 | Wolf | 379/88.16 |
| 5,812,639 | * 9/1998 | Bartholomew et al. | 370/352 |
| 5,825,865 | 10/1998 | Oberlander et al. | 379/211 |
| 5,909,483 | * 6/1999 | Weare et al. | 379/88.18 |
| 5,978,450 | * 11/1999 | McAllister et al. | 379/88.02 |
| 5,995,596 | * 11/1999 | Shaffer et al. | 379/88.18 |
| 5,999,611 | * 12/1999 | Tatchell et al. | 379/211 |
| 6,014,427 | * 1/2000 | Hanson et al. | 379/67.1 |
| 6,067,456 | * 5/2000 | Duran | 455/461 |
| 6,163,606 | * 12/2000 | Otto | 379/211 |
| 6,167,119 | * 12/2000 | Bartholomew et al. | 379/88.04 |

* cited by examiner

*Primary Examiner*—Fan Tsang
*Assistant Examiner*—Ovidio Escalante

(57) ABSTRACT

Personal dial tone service is used to identify the user of a subscriber line to a telephone terminal and, based on that identification, the system and method dynamically configures that line with the personal profile of that user. Such a line is used in a roaming situation to provide voice mail service to the roamer through an emulation of the roamer's home voice mail interface. The emulation is accomplished by storage at the home locale of the roamer of object oriented script associated with both executable and non-executable data duplicating or emulating executable and non-executable data in the roamer's home voice mail system. The script directs the running of the executables using the non-executables at the roaming central office to provide to the roamer at that remote office voice mail service using virtually the same interface as the interface to which the roamer is accustomed at his home locale. The script is stored in an Intelligent Peripheral wherein the executables are run pursuant to the script. Voice mail messages may be stored either in the remote or home locals.

45 Claims, 4 Drawing Sheets

PERSONAL TELEPHONE SERVICE WITH TRANSPORTABLE SCRIPT CONTROL OF SERVICES

REFERENCE TO RELATED APPLICATIONS

This application is a continuation-in-part of and claims the benefit of the filing dates of the following U.S. Patent Applications: Ser. No. 09/006,033 filed Jan. 12, 1998 (now U.S. Pat. No. 6,167,119); Ser. No. 08/828,959 filed Mar. 8, 1997 (now U.S. Pat. No. 5,978,450); Ser. No. 08/904,936 filed Aug. 1, 1997 (now U.S. Pat. No. 6,038,305); and Ser. No. 08/997,505 filed Dec. 23, 1997 (now U.S. Pat. No. 6,101,242).

This application also is related to U.S. patent application Ser. No. 09/056,614 filed Apr. 8, 1998 (now U.S. Pat. No. 6,122,357).

TECHNICAL FIELD

The present invention relates to personalized telecommunications service and more particularly to personalized voice mail service, preferably offered through an intelligent telephone network.

Acronyms

The written description uses a large number of acronyms to refer to various services, messages and system components. Although generally known, use of several of these acronyms is not strictly standardized in the art. For purposes of this discussion, acronyms therefore will be defined as follows:

- Address Complete Message (ACM)
- Advanced Intelligent Network (AIN)
- ANswer Message (ANM)
- Automatic Number Identification (ANI)
- Call Processing Record (CPR)
- Central Office (CO)
- Common Channel Interoffice Signaling (CCIS)
- Data and Reporting System (DRS)
- Destination Point Code (DPC)
- Generic Data Interface (GDI)
- Initial Address Message (IAM)
- Integrated Service Control Point (ISCP)
- Integrated Services Digital Network (ISDN)
- ISDN User Part (ISDN-UP)
- Intelligent Peripheral (IP)
- Line Identification Data Base (LIDB)
- Multi-Line Hunt Group (MLHG)
- Multi-Services Application Platform (MSAP)
- Office Equipment (OE)
- Origination Point Code (OPC)
- Personal Communications Service (PCS)
- Plain Old Telephone Service (POTS)
- Point in Call (PIC)
- Personal Identification Number (PIN)
- Primary Rate Interface (PRI)
- Public Switched Telephone Network (PSTN)
- Service Control Point (SCP)
- Service Creation Environment (SCE)
- Service Management System (SMS)
- Service Switching Point (SSP)
- Signaling System 7 (SS7)
- Signaling Point (SP)
- Signaling Transfer Point (STP)
- Simplified Message Desk Interface (SMDI)
- Speaker Identification/Verification (SIV)
- Terminating Attempt Trigger (TAT)
- Time Slot Interchange (TSI)
- Traffic Service Position System (TSPS)
- Transaction Capabilities Applications Part (TCAP)
- Transmission Control Protocol/Internet Protocol (TCP/IP)

BACKGROUND ART

Today the public switched telephone network (PSTN) and other telephone networks such as cellular systems provide most telephone services based on number identification of the telephone set or line that each party uses. Services are personalized only to the extent that a party uses the same line and/or instrument. For example, a person typically has one set of service features and billing options available via a telephone on the person's desk at the office, another set of service features and billing options available via the telephone line to their home and perhaps a third set of service features and billing options available via a wireless telephone (e.g. cellular or personal communications service (PCS)). The networks process calls to and from each of these different subscriber telephones based on a separate telephone number. Also, a caller may use personalized billing options by using a calling card, but often the input operations for calling card service are overly complex. With the exception of calling card billing, each person using a particular telephone typically can only access those service features and billing options associated with the particular line or telephone instrument.

The proliferation of services causes subscribers inconvenience. For example, circumstances arise in which a subscriber may want a feature or billing option normally associated with one line or instrument, such as the office telephone, when they are in fact using a different line or instrument such as their home or PCS telephone. Alternatively, two or more persons using one telephone or line often want different sets of service options. Also, the extreme increase in demand for telephone services is rapidly exhausting the capacity of the network, particularly in terms of the telephone numbers available under the current numbering plan.

A number of specific solutions have been proposed for individual problems, such as work at home and/or transfer of service to new location(s) as an individual travels. However, each of these solutions is limited or creates its own new problems.

For example, U.S. Pat. No. 4,313,035 to Jordan et al. discloses a method of using an intelligent network to provide a 'follow-me' type service through multiple exchanges of the switched telephone network using an AIN type of telephone system architecture. Each subscriber to the locator service has a unique person locator telephone number. To access the system to update data in a service control database, the subscriber dials 0700 and his unique person locator telephone number. The telephone switching office routes the call to a traffic service position system (TSPS) which prompts the caller (e.g. provides an additional dial tone) and receives further digits from the subscriber. The subscriber inputs a three digit access code, indicating the type of update call, and a four-digit personal identification number. If calling from the remote station to which the subscriber wishes his calls routed, the local switching office forwards the line identification number of that station to the TSPS. The TSPS forwards the dialed information and the line identification to the database for updating the particular subscriber's location record. A caller wishing to reach the subscriber dials the subscriber's unique person locator number. A telephone switching office sends the dialed number to the central database. The database retrieves the stored completion number for the called subscriber and forwards that number back to the switching office to complete the call.

The Jordan et al. approach allows calls to follow the subscriber to each new location, but the subscriber must have a unique telephone number for this service. Each station that receives a call also must have a unique telephone number. As such, the Jordan et al. approach actually exacerbates the shortage of telephone numbers. Also, Jordan et al. rely on subscriber input of identification numbers. Subscribers often find this inconvenient, and this technique is often prone to number entry errors.

U.S. Pat. No. 4,899,373 to Lee et al. discloses a system for providing special telephone services to a customer on a personal basis, when the customer is away from his or her home base or office. The personalized services are provided in a multiple exchange office environment, using a central database for feature control. The nationally accessible central database system stores feature data in association with personal identification numbers. A subscriber wishing to use his personalized features while away from home base dials a special code and presents the personal identification number. The exchange transmits a query to the central database, and the corresponding feature data is retrieved from the database. The database forwards the feature data to the exchange, and the exchange stores the received feature data in association with the station from which the request was initiated. Subsequently, the exchange accesses the downloaded feature data to provide telephone service corresponding to the subscriber's personalized telephone features via the station the subscriber is currently operating from. A temporary office arrangement may be established in which the personalized features will be immediately available on incoming and outgoing calls for a period of time specified by the subscriber.

U.S. Pat. No. 5,206,899 to Gupta et al. pertains to a system wherein a subscriber can assign desired characteristics to any "target station" which is an active telephone accessible to a telecommunications network. A call thereafter that originates from the target station can use customized features, such as account code dialing and corporate billing arrangements. Initially, a service profile is created and stored for each subscriber and contains information describing desired features and billing options. The characteristics of a particular target station are changed by an activation process that can be initiated from any location. Automatic number identification (ANI) information associated with the target station is entered into an ANI trigger table in an intelligent switch, and the service profile is loaded into a database. When a call originates from the target station, information in the database is applied to the switch to provide the desired characteristics. An example of one of the features is when an employee of company X wishes to make business related calls from his/her telephone, the call has the characteristics of a call made from the office by a special billing arrangement.

Like Jordan, the Lee et al. and Gupta et al. systems depend on a dialed number entry by the subscriber to activate the service. Also, the Lee et al. and Gupta et al. systems do not provide a simple manner for more than one subscriber to obtain personalized service over the same telephone line. In Lee et al., during the period when the switch stores the roaming subscriber's profile in association with the line, all calls are processed based on that one profile. Similarly, in Gupta et al., while the ANI trigger is set against the line, all outgoing calls cause database access and use of the subscriber's profile in the database. There is no way to fall back on the normal profile for that line unless and until the service for the roaming subscriber is cancelled with respect to that one line.

U.S. Pat. No. 5,247,571 to Kay et al. discloses an Area Wide Centrex service provided by an advanced intelligent telephone network. The service provides centrex features, such as extension dialing, to multiple locations. The Kay et al. Patent also suggests a Work-at-Home feature. This feature allows the home telephone line to selectively operate as a residential line or as a Centrex business line, on a call-by-call basis. For a business call, the user would preface each call with an access indicator to identify a business call. When an outgoing call from the home line lacks the access indicator, the network processes the call as a standard residential call.

The Work-at-Home feature in the Kay et al. system requires only dialing of a code before each outgoing business call. However, the Kay et al. approach requires that the business profile is stored in association with the home line before the subscriber makes the call. The subscriber can use the Centrex billing and service features from the business account only from a home telephone previously associated with the business line. The subscriber can not use the billing and service features from the business account from any randomly selected telephone. Also, from the home line, a person can either use the normal residential profile service or the pre-defined business profile service. There is insufficient flexibility to enable a wider range of services for multiple subscribers through the one line.

U.S. Pat. No. 5,422,936 to Douglas J. Atwell, issued Jun. 6, 1995, describes an Enhanced Message Service Indication. For a number of years, telephone companies have been providing a service which assigned two or more directory numbers per line and corresponding distinctive ringing signals. One of the telephone switch vendors refers to this feature as "Multiple Directory Numbers per Line" or "MDNL." This patent provides a system for providing voice mail service in a MDNL situation. The system is effective in serving its intended purpose but assumes the assignment of one directory or telephone number for each subscriber or service. As previously stated the current demand for telephone services is rapidly exhausting the capacity of the network, particularly in view of the telephone numbers available under the current numbering plan.

Also, the above discussed examples of prior suggestions to customize services have not adapted the caller identification to correspond to the actual party using the telephone on the outgoing call. For example, in a system like that of Lee, Gupta or Kay, the caller might use features and billing options associated with her personalized or work service, but any such calls would produce a caller ID display identifying the number of the station from which she originated the call. If the called party subscribed to the name type enhanced caller ID, the network would provide a name associated with that telephone number, not the name of the actual calling party.

Another enhanced service which has become extremely popular is so called Voice Mail service. Voice mail is a service which may be considered a custom calling service and normally includes in its operation the use of call forwarding. Voice mail has become commonplace not only in business usage but also on an individual telephone service subscriber basis through Centrex service from a central office. A voice mail system is a specialized computer that stores messages in digital form on a fixed disk. The voice is generally digitized, usually at a much slower rate than the 64 Kb/s signal the central office uses in its switching network. The digitized voice is compressed and stored on a hard disk that maintains the voice mail operating system, system prompts, and greetings, and the messages themselves. A processor controls the compressing, storing, retrieving, forwarding and purging of files. A form of early systems is described in Matthews et al. U.S. Pat. No. 4,371,752 (hereinafter the Matthews '752 Patent), issued in Feb., 1983, and several related patents. U.S. Pat. No. 4,585,906 (hereinafter the Matthews '906 Patent), issued Apr. 29, 1986 to Gordon H. Matthews et al. The Matthews '906 Patent is a continuation-in-part of the Matthews '752 Patent. U.S. Pat. No. 4,602,129 (hereinafter the Matthews '129 Patent), issued Jul. 22, 1986 to Gordon H. Matthews et al. The Matthews '129 Patent is a continuation-in-part of the '752 Matthews Patent.

The three Matthews Patents each describe a voice mailbox type system using digital storage and programmed control to offer a wide variety of message storage, forwarding and delivery type services.

U.S. Pat. No. 4,625,081, issued Nov. 25, 1986, to Lawrence A. Lotito, et al. This patent describes an automated telephone voice service system which provides automatic recording and editing of voice messages as well as forwarding of recorded voice messages to other accounts and telephone numbers with or without operator assistance.

In all of the foregoing systems voice mail is provided to a single subscriber premises line or, as in the Atwell Patent, to a single subscriber number.

A need still exists for an effective and user friendly system for providing personalized calling service features, including actual subscriber identification for voice mail purposes. In particular a need exists for a system for providing personalized features which would facilitate a degree of call control permitting the accomplishment of new functions, including enhanced voice mail and voice mail roaming, and which would improve the handling of functions which are now subject to being accomplished only in cumbersome and inconvenient fashions.

DISCLOSURE OF THE INVENTION

According to the present invention personal dial tone service is used to identify the user of a line to a terminal and, based on that identification, the system and method will dynamically configure that line with the personal profile of that user. In a specific example, that line would be used for the user's voice mail, any indication or notification of messages, any voice dialing features, and any other features that the user may have available at the user's home or office terminal, as the case may be. In this manner the user may utilize such features whether calling from a distant hotel, home of a friend, or other terminal. This is accomplished through transfer of data and script as part of the transfer of the overall personal user profile. This enables the running of applications at the remote or roaming locale under control of the script in order to duplicate or emulate the interface that the user has on their home or work terminal, as the case may be. Thus if the user has a voice mail interface of a VMS of one voice mail vendor at home on the east coast, the network transmits a script and profile that, in effect, duplicates that interface on the line serving a terminal on the west coast where the user has been identified. The script is dynamically transferred to provide for running of the first vendor's VMS interface as an interface to another vendor's voice mail system at the remote locale.

BRIEF DESCRIPTION OF DRAWINGS

The drawing figures depict the present invention by way of example, not by way of limitations. In the figures, like reference numerals refer to the same or similar elements.

BEST MODE FOR CARRYING OUT THE INVENTION

In response to each of several types of service requests, the personalized service of the present invention initially identifies the individual subscriber or user, preferably using a speaker identification/verification procedure. The system then retrieves profile information corresponding to the identified subscriber or user. The communication network processes one or more calls to or from an identified communication link using the individual user's profile data. On an outgoing telephone call from the subscriber or user, for example, the service request may at times be an off-hook signal, or at other times a dialed number or other pre-established trigger, and the network may provide 'dial-tone' type telephone services based on the retrieved profile information. In this example, the network may provide a dial tone signal or a customized prompt and then permit the caller to out-dial a call. Caller identification establishes available calling features based on the profile information. The network also provides personalized services on incoming calls based on the identity of the called party and on data contained in the individual profile of such party.

The personalized service may utilize a variety of different networks. For example, the service may be adaptable to Internet based voice communications. The preferred embodiments utilize various implementations of modern telephone networks. To understand the invention, it may be helpful first to consider the architecture and operation of an advanced intelligent network (AIN) type implementation of a public switched telephone network.

Figure 1:
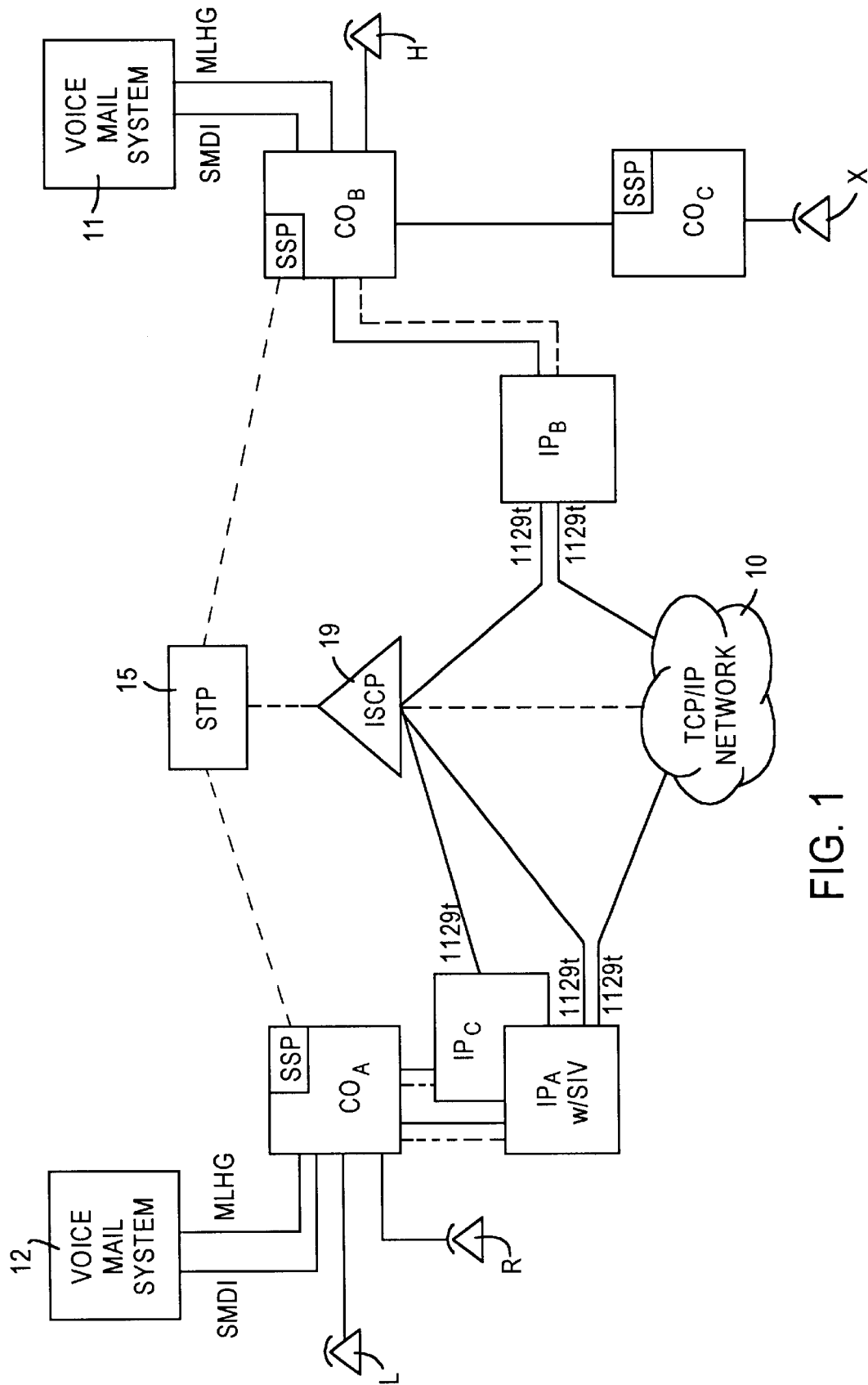
FIG. 1 is a simplified block diagram of an intelligent telephone network that may be used to offer the personalized service of the present invention.

FIG. 1 provides a simplified illustration of a preferred intelligent telephone network for implementing the personal dial tone service in accord with the present invention. As shown, the telephone network includes a switched traffic network and a common channel signaling network carrying the control signaling messages for the switched telephone traffic network. In this implementation, the system further includes a secondary signaling network, as well as packet data transport network 10.

The telephone or traffic network (operated by a combination of local carriers and interexchange carriers) includes a number of end office and tandem office type central office switching systems. The switching systems shown illustratively in FIG. 1 are referenced as $CO_A$, $CO_B$, and $CO_C$. The central office switching systems are SSP capable as will be described in further detail. Trunk circuits (not shown) carry communication traffic between the central office switches. The preferred telephone network includes a common channel interoffice signaling (CCIS) network carrying a variety of signaling messages, principally relating to control of processing of calls through the traffic portion of the network. The CCIS network includes packet data links (shown as dotted lines) connected to appropriately equipped central office switching systems, such as offices $CO_A$, $CO_B$, and $CO_C$, and a plurality of packet switches, termed Signaling Transfer Points (STPs) 15. To provide redundancy and thus a high degree of reliability, the STPs 15 typically are implemented as mated pairs. The CCIS network of the telephone system operates in accord with an accepted signaling protocol standard, preferably Signaling System 7 (SS7).

In the preferred embodiment shown in FIG. 1, each central office has at least minimal SS7 signaling capability, which is conventionally referred to as a signaling point (SP) in reference to the SS7 network. As such, the offices can exchanges messages relating to call set-up and tear-down, typically in ISDN-UP format. At least some, and preferably all, of the central office switches or COs, are programmed to recognize identified events or points in call (PICs) as advanced intelligent network (AIN) type service triggers. These are referred to as Service Switching Points or SSPs. The central offices $CO_A$, $CO_B$, and $CO_C$ are shown as having SSP capability.

In response to a PIC or trigger, a central office initiates a query through the CCIS signaling network to a control node to either a Service Control Point (SCP) or Integrated Service Control Point (ISCP) 19 or to a database system, such as a Line Identification Database (LIDB), which is not here shown. The ISCP 19 provides instructions relating to AIN type services. The LIDB provides subscriber account related information, for calling card billing services or for subscriber name display purposes in an enhanced caller ID application.

The central office switching systems or COs typically consist of programmable digital switches with CCIS communications capabilities. One example of such a switch is a 5ESS type switch manufactured by AT&T; but other vendors, such as Northern Telecom and Seimens, manufacture comparable digital switches which could serve as the SSPs and SPs. The SSP type implementation of such switches differs from the SP type implementation of such switches in that the SSP switch includes additional software to recognize the full set of AIN triggers and launch appropriate queries. A specific example of an SSP capable switch is discussed in detail later, with regard to FIG. 2.

One key feature of the present invention is that the program controlled switch accepts instructions to load profiles and/or receives profiles over a signaling link. In most cases, these profiles are identified by virtual office equipment numbers. The profiles include a range of information relating to subscribers services, such as service features, classes of service, individual billing options and, according to a preferred feature of the invention, information relating to the performance of functions related to voice mail.

The above described data signaling network between the SSP type central offices 11 and the ISCP 19 is preferred, but other signaling networks could be used. For example, instead of the packet switched type links through one or more STPs, a number of central office switches, an SCP and any other signaling nodes could be linked for data communication by a token ring network. Also, the SSP capability may not always be available at the local office level, and several other implementations might be used to provide the requisite SSP capability. For example, none of the end office switches may have SSP functionality. Instead, each end office would connect through a trunk to a tandem office which has the SSP capability. The SSP tandem then communicates with the SCP via an SS7 type CCIS link, as in the implementation described above. The SSP capable tandem switches are digital switches, such as the 5ESS switch from AT&T; and the non-SSP type end offices might be 1A analog type switches.

The ISCP 19 may be a general purpose computer storing a database of call processing information. In the preferred implementation shown in FIG. 1, the ISCP actually is an Integrated Service Control Point (ISCP) developed by Bell Atlantic and Bell Communications Research. The ISCP is an integrated system. Among other system components, the ISCP includes a Service Management System (SMS), a Data and Reporting System (DRS) and the actual database, also referred to as a Service Control Point (SCP). In this implementation, the SCP maintains a Multi-Services Application Platform (MSAP) database which contains call processing records (CPRs) for processing of calls to and from various subscribers. The ISCP also typically includes a terminal subsystem referred to as a Service Creation Environment or SCE for programming the MSAP database in the SCP for the services subscribed to by each individual customer.

The components of the ISCP are connected by an internal, high-speed data network, such as a token ring network. The internal data network also typically connects to a number of interfaces for communication with external data systems, e.g. for provisioning and maintenance. In the preferred embodiment, one of these interfaces provides communications to and from the ISCP 19 via a packet switched data network, such as the TCP/IP network 10.

The SCP may be implemented in a variety of other ways. The SCP may be a general purpose computer running a database application and may be associated with one of the switches. Another alternative is to implement a database of CPRs or the like within an STP (see e.g. Farris et al. U.S. Pat. No. 5,586,177).

The preferred telephone network also includes one or more intelligent peripherals (IPs), such as $IP_A$ and $IP_B$, which provide enhanced announcement and digit collection capabilities and speech recognition. These IPs may be essentially similar to that disclosed in commonly assigned U.S. Pat. No. 5,572,583 to Wheeler, Jr. et al. entitled "Advanced Intelligent Network with Intelligent Peripherals Interfaced to the Integrated Services Control Point." The disclosure of the network and operation of the IP in that Patent is incorporated herein in its entirety by reference.

The IPs $IP_A$ and $IP_B$ may connect to one or more central offices $CO_A$ and $CO_B$. The connections transport both communication traffic and signaling. The connection between a central office and the IP may use a combination of a T1 and a Simplified Message Desk Interface (SMDI) link, but preferably this connection utilizes a primary rate interface (PRI) type ISDN link. Each such connection provides digital transport for a number of two-way voice grade type telephone communications and a channel transporting signaling data messages in both directions between the switch and the IP.

There are certain circumstances in which the ISCP 19 communicates with the IPs. These communications could utilize an 1129+ protocol and go through an SSP type central office and the SS7 network. However, in the preferred embodiment of FIG. 1, the IPC and the ISCP 19 communicate with each other via a separate second signaling network. These communications through that network between the IP and the SCP may utilize an 1129+ protocol or a generic data interface (GDI) protocol as discussed in the above incorporated Patent to Wheeler, Jr. et al.

The typical IPs $IP_A$ and $IP_B$ can provide a wide range of call processing functions, such as message playback and digit collection. In the preferred system, the IP also performs speaker identification/verification (SIV) on audio signals received from users. Specifically, the IP used for the personalized service includes a voice authentication module to perform the necessary speaker identification/verification function. These IPs also include storage for subscriber specific template or voice feature information, for use in identifying and authenticating subscribers based on speech.

In the simplest form, the IP serving a subscriber's local area stores the templates and performs the speaker identification/verification. However, in a system serving a large geographic area and providing personal dial tone to a large, roaming subscriber base, the templates may be transferred between SCP/IP pairs, to allow an IP near a subscriber's current location to perform the speaker identification/verification on a particular call. For example, if a remote IP required a template for a subscriber from the region served by the local IP, the remote IP would transmit a template request message through the 1129+ or GDI network to the local IP. The local IP would transmit the requested template back through the data network to the remote IP.

In a network such as shown in FIG. 1, routing typically is based on dialed digit information, profile information regarding the link or station used by the calling party, and profile information regarding a line or station in some way associated with the dialed digits. Each exchange is identified by one or more three digit codes. Each such code corresponds to the NXX digits of an NXX-XXXX (seven digit) telephone number or the three digits following the area code digits (NPA) in a ten-digit telephone number. The telephone company also assigns a telephone number to each subscriber line connected to each switch. The assigned telephone number includes the area code and exchange code for the serving central office and four unique digits.

Central office switches utilize office equipment (OE) numbers to identify specific equipment such as physical links or circuit connections. For example, a subscriber's line might terminate on a pair of terminals on the main distribution frame of a switch. The switch identifies the terminals, and therefore the particular line, by an OE number assigned to that terminal pair. For a variety of reasons, the operating company may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, an end office type switch will detect an off-hook condition on the line and provide dial tone. The switch identifies the line by its OE number. The office also retrieves profile information corresponding to the OE number and off-hook line. If needed, the profile identifies the currently assigned telephone number. The switch in the end office receives dialed digits and routes the call. The switch may route the call to another line serviced by that switch, or the switch may route the call over trunks and possibly through one or more tandem offices to an office that serves the called party's station or line. The switch terminating a call to a destination will also utilize profile information relating to the destination, for example to forward the call if appropriate, to apply distinctive ringing, etc.

AIN call processing involves a query and response procedure between an SSP capable switching office and a database system, such as the ISCP 19. The SSP capable switching offices initiate such processing upon detection of triggering events. At some point during processing of a telephone call, a central office switching system will recognize an event in call processing as a 'Point in Call' (PIC) which triggers a query to the ISCP 19. Ultimately, the ISCP 19 will return an instruction to the switching system to continue call processing. This type of AIN call processing can utilize a variety of different types of triggers to cause the SSPs to initiate the query and response signaling procedures with the ISCP 19. In the presently preferred embodiments discussed below, the personal dial tone service utilizes an off-hook immediate trigger, a dialed number (alone or in conjunction with another key) trigger and a terminating attempt trigger (TAT), to facilitate different aspects of the service.

In accord with one aspect of the present invention, before providing dial-tone service, the SSP central office that is serving an outgoing call extends the call to the IP providing the speaker identification/verification (SIV) functionality. In the preferred embodiments, this operation involves AIN type call routing to the IP. The IP prompts the caller and collects identifying information, preferably in the form of speech. The IP analyzes the caller's input to identify the caller as a particular subscriber. If successful, the IP signals the SSP to load profile data for that subscriber into the register assigned to the call in the call store. In most of the preferred service applications, the IP disconnects, and the SSP central office processes the call in accord with the loaded profile information. For example, the central office may now provide actual dial tone or provide a message prompting the caller to dial a destination number. The caller dials digits, and the central office processes the digits to provide the desired outgoing call service, in the normal manner. The IP may stay on the line, to monitor speech and thus caller identity, for some service applications.

The call processing by the central office switch utilizes the loaded subscriber profile information. For example, the profile data may indicate specific procedures for billing the call to this subscriber on some account not specifically linked to the originating telephone station or line.

The inventors also envision use of selected subscriber profile information on incoming calls. When a serving central office SSP detects a call to a line having the personalized service, processing hits a terminating attempt trigger (TAT). The SSP interacts with the ISCP 19 and routes the call to the IP. The IP prompts the caller to identify a desired called party, e.g. one of the several students sharing the dormitory line. Menu announcement together with either digit collection or preferably speech recognition processing by the IP facilitates identification of the desired called party from those associated with the line. Based on identification of the called subscriber, the IP signals the SSP switch to load profile data for that subscriber into the register assigned to the call in the call store. In this case, however, the switch uses selectively loaded profile information for terminating the call. The IP disconnects, and the SSP central office processes the call in accord with the loaded profile information.

For example, the central office may provide a distinctive ringing signal corresponding to the identified subscriber. This service enables distinctive ringing for multiple subscribers on one line without assigning each subscriber a separate telephone number. The loaded profile information may specify call forwarding in event of a busy or no-answer condition. This enables routing of the call to the identified subscriber's mailbox, or another alternate destination selected by the subscriber, even though the call did not utilize a unique telephone number uniquely assigned to the called subscriber.

The present invention also encompasses a procedure in which a subscriber calls in from a line not specifically designated for personal dial tone service. The network routes the call to the IP, and the IP identifies the subscriber and the line from which the subscriber called-in. The subscriber can interact with the IP to have her personal dial tone service associated with that line, either for one call or for some selected period of time. The IP instructs the appropriate central office switch(es) to load profile data associated with the subscriber.

The IP might instruct the end office switch to load the profile data only in the assigned call store register. The switch would use the profile data only for a single call, for example to bill a call from a pay-phone or a hotel room telephone to the subscriber's home account. Alternatively, the IP might instruct the central office serving the line to the calling station to utilize a virtual office equipment number (OE) and associated profile data for calls to and from that line for some period of time. In this later example, the IP would also instruct the central office serving the line to the subscriber's home station to modify the subscriber's profile to forward calls for the subscriber's telephone number. The modified profile data in the home office would result in forwarding of the subscriber's incoming calls through the office to the selected station, for the set period of time.

The present invention relies on the programmable functionality of the central office switches and the enhanced call processing functionalities offered by the IPs. To understand these various functionalities, it may be helpful to review the structure and operation of a program controlled central office and one implementation of an IP. Subsequent description will explain several of the above outlined call processing examples in greater detail.

Figure 2:
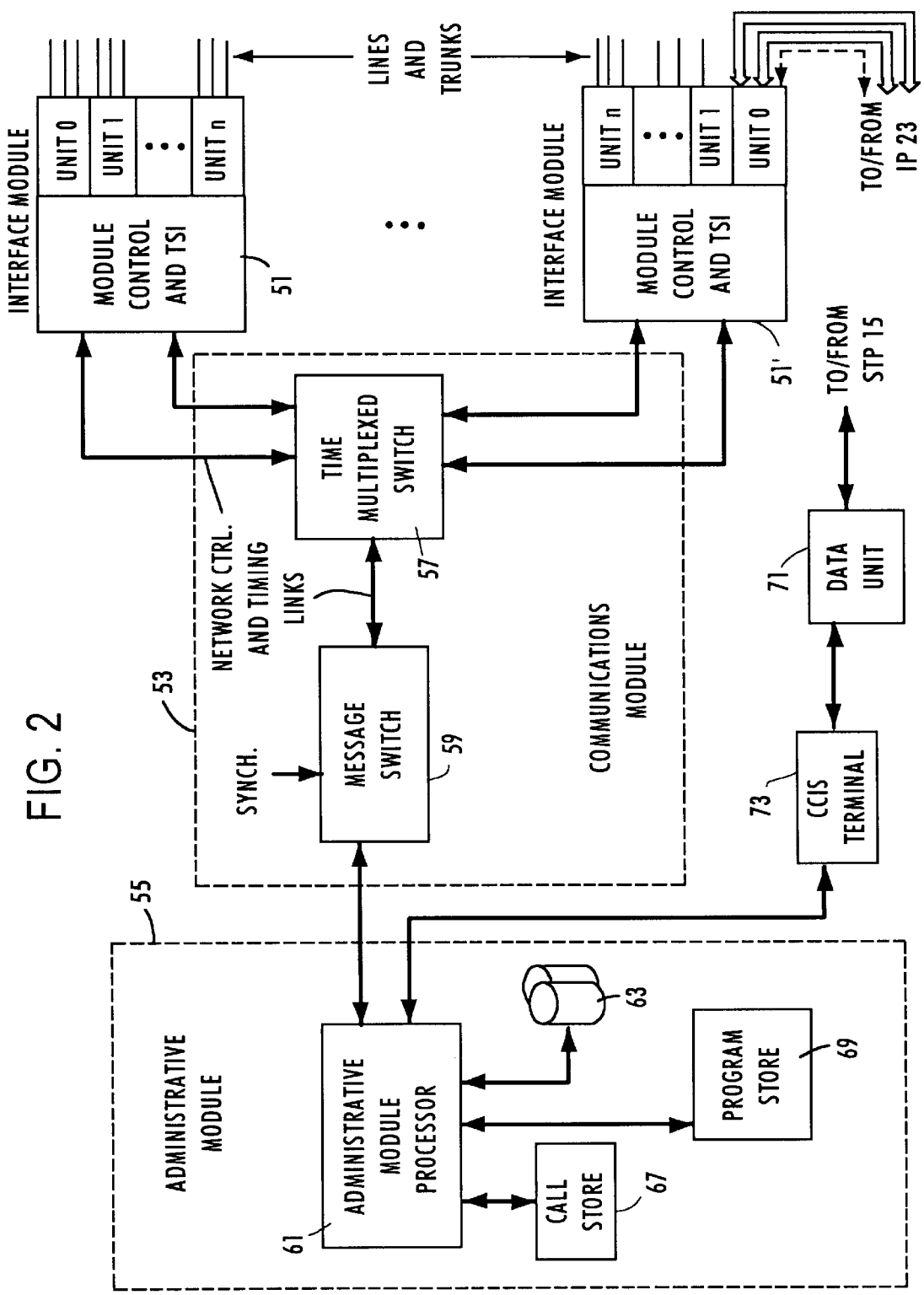
FIG. 2 is a simplified block diagram illustrating the significant functional components of an SSP type central office switching system used in the network of FIG. 1.

FIG. 2 is a simplified block diagram of an electronic program controlled switch which may be used as any one of the SSP type central offices in the system of FIG. 1. As illustrated, the switch includes a number of different types of modules. In particular, the illustrated switch includes interface modules 51 (only two of which are shown), a communications module 53 and an administrative module 55.

The interface modules 51 each include a number of interface units 0 to n. The interface units terminate lines from subscribers' stations, trunks, T1 carrier facilities, etc. Each such termination is identified by an OE number. Where the interfaced circuit is analog, for example a subscriber loop, the interface unit will provide analog to digital conversion and digital to analog conversion. Alternatively, the lines or trunks may use digital protocols such as T1 or ISDN. Each interface module 51 also includes a digital service unit (not shown) which is used to generate call progress tones and receive and detect dialed digits in pulse code or dual-tone multifrequency form.

Figure 3:
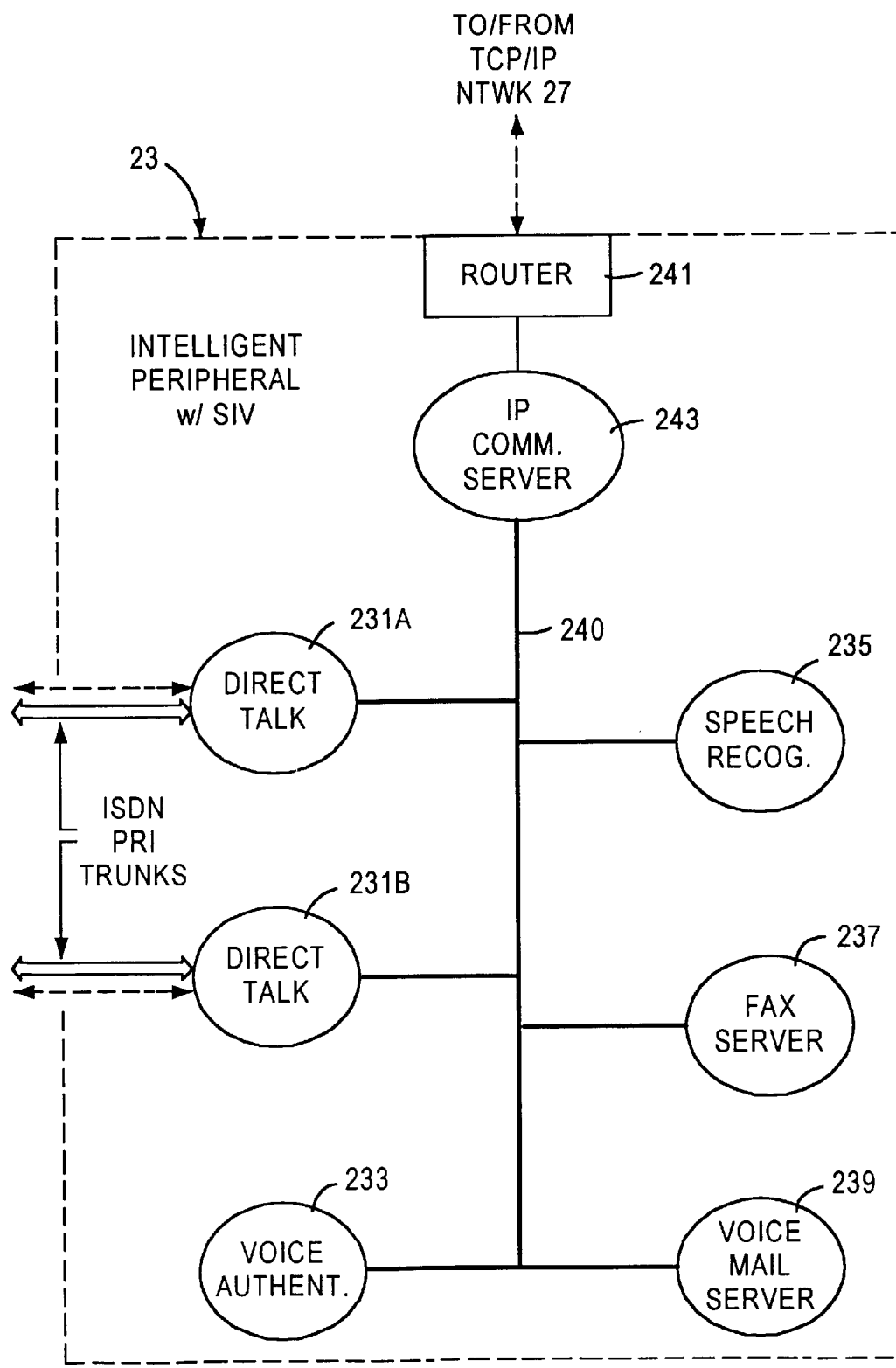
FIG. 3 is a simplified block diagram illustrating the significant functional components of a typical Intelligent Peripheral (IP) used in the network of FIG. 1.

In the illustrated embodiment, the unit 0 of the interface module 51' provides an interface for the signaling and communication links to the IP 23 seen in FIG. 3. In this implementation, the links preferably consist of one or more ISDN PRI circuits each of which carries 23 bearer (B) channels for communication traffic and one data (D) channel for signaling data.

Each interface module 51 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the time multiplexed switch 57 and a message switch 59. The time multiplexed switch 57 provides time division transfer of digital voice data packets between voice channels of the interface modules 51 and transfers signaling data messages between the interface modules. The switch 57 together with the TSIs of the interface modules form the overall switch fabric for selectively connecting the interface units in call connections.

The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example a link for receiving a synchronization carrier used to maintain digital synchronism.

The administrative module 55 provides high level control of all call processing operations of the switch 11. The administrative module 55 includes an administrative module processor 61, which is a computer equipped with disc storage 63, for overall control of CO operations. The administrative module processor 61 communicates with the interface modules 51 through the communication module 55. The administrative module 55 may include one or more input/output processors (not shown) providing interfaces to terminal devices for technicians and data links to operations systems for traffic, billing, maintenance data, etc.

A CCIS terminal 73 and an associated data unit 71 provide an SS7 signaling link between the administrative module processor 61 and one of the STPs 15 (see FIG. 1). Although only one such link is shown, preferably there are a plurality of such links providing redundant connections to both STPs of a mated pair and providing sufficient capacity to carry all necessary signaling to and from the particular office 11. The SS7 signaling through the terminal 73, the data unit 71 and the STPs provides two-way signaling data transport for call set-up related messages to and from other offices. These call set-up related messages typically utilize the ISDN-UP (ISDN-users part) protocol portion of SS7. The SS7 signaling through the terminal 73, the data unit 71 and the STPs also provides two-way signaling data transport for communications between the office 11 and database systems or the like, such as the SCP 19. The communications between the central office 11 and the database systems or the like utilize the TCAP (transactions capabilities applications part) protocol portion of SS7.

As illustrated in FIG. 2, the administrative module 55 also includes a call store 67 and a program store 69. Although shown as separate elements for convenience, these are typically implemented as memory elements within the computer serving as the administrative module processor 61. The program store 69 stores program instructions which direct operations of the computer serving as the administrative module processor 61.

For each call in progress, a register assigned within the call store 67 stores translation and user profile information retrieved from disc storage 63 together with routing information and any temporary information needed for processing the call. For example, for a residential customer initiating a call, the call store 67 would receive and store line identification and outgoing call billing information corresponding to an off-hook line initiating a call. For the personal dial-tone service, the assigned register in the call store 67 will receive and store different profile data depending on the particular subscriber associated with any given call. A register in the call store is assigned and receives profile data from the disc memory both for originating subscribers on outgoing calls and for terminating subscribers on incoming calls.

A variety of adjunct processor systems known in the telephone industry can be used as the IPs. The critical requirements are that the IP system process multiple calls and perform the subscriber identification functions, preferably by speaker identification and authentication. FIG. 3 is a functional diagram illustration of an IP for performing the subscriber identification functions, possibly by dialed digit input and preferably by analysis and recognition of speech.

The preferred IP architecture utilizes separate modules for different types of services or functions, for example, one or two Direct Talk type voice server modules 231A, 231B for interfacing ISDN PRI trunks to the SSP central office(s) 11. Separate modules 233, 235 perform voice authentication and speech recognition. The IP includes a variety of additional modules for specific types of services, such as a server module 237 for fax mail, and another server 239 for voice mail services. The various modules communicate with one another via an internal data communication system or bus 240, which may be an Ethernet type local area network.

Each Direct Talk module 231A or 231B comprises a general purpose computer, such as an IBM RS-6000, having digital voice processing cards for sending and receiving speech and other audio frequency signals, such as IBM D-talk 600 cards. Each voice processing card connects to a voice server card which provides the actual interface to T1 or primary rate interface ISDN trunks to the switching office. In the PRI implementation, the Direct Talk computer also includes a signaling card, providing two-way signaling communication over the D-channel of the PRI link. Each Direct Talk computer also includes an interface card for providing two-way communications over the internal data communications system 240.

The voice processing cards in the Direct Talk modules 231A, 231B provide voice message transmission and dialed digit collection capabilities. The modules 231A, 231B also perform the necessary line interface functions for communications to and from those servers which do not incorporate actual line interfaces. For example, for facsimile mail, a Direct Talk module 231 connected to a call would demodulate incoming data and convert the data to a digital format compatible with the internal data communication network 240. The data would then be transferred over network 240 to the fax server 237. For outgoing facsimile transmission, the server 237 would transfer the data to one of the Direct Talk modules over the network 240. The Direct Talk module 231 would reformat and/or modulate the data as appropriate for transmission over the ISDN link to the switch 11.

The Direct Talk modules provide a similar interface function for the other servers, such as the voice mail server 239, the speech recognition module 235 and the voice authentication module 233. For incoming speech signals, the Direct Talk module connected to a call receives digital speech signals in the standard pulse code modulation format carried on a B-channel of an ISDN link. The Direct Talk module reformats the speech data and transmits that data over the internal network 240 to the server or module performing the appropriate function, for example to the authentication module 233 for analysis and comparison of features to stored templates or feature data for known subscribers.

In the outgoing direction, the currently connected Direct Talk module may play an announcement from memory, e.g. to prompt a caller to say their name. Alternatively, the Direct Talk module may receive digitized speech over the network 240 from one of the other modules, such as a stored message retrieved from voice mail server 239. The Direct Talk module reformats the speech signal as needed for transmission over the ISDN B-channel to the caller.

The illustrated IP also includes a communication server 243. The communication server 243 connects between the data communication system 240 and a router 241, which provides communications access to the TCP/IP network 27 that serves as the second signaling communication system. The communication server 243 controls communications between the modules within the IP and the second signaling communication system. The server 243 and the router 241 facilitate communication between the elements of the IP and the ISCP 19. The IP may also use this communication system to communicate with other IP's, for example to send subscriber voice template information to a remote IP or to receive such information from that IP or some other network node.

The personalized service relies on the voice authentication module 233 to perform the necessary speaker identification/verification function. For the identification and authentication of subscribers or users, the voice authentication module 233 within the IP stores a template or other feature or voice pattern information for each person who has the personalized service in the area that the IP services. For example, if the subscriber utilizes the personal dial tone service from a particular line, such as a shared line in a dormitory or the like, the IP stores the subscriber's voice pattern information in a file associated with the office equipment (OE) number of the particular line. If the IP serving a call does not store the template or feature data for a particular subscriber, the IP may obtain subscriber identification by dialed digit input and then obtain a copy of the template or feature data from a remote IP via communication through the TCP/IP network 27, in order to authenticate the subscriber's identity.

Using current technology, a new subscriber or user would get on line with the IP serving that subscriber and 'train' that IP by speaking certain phrases. From the received audio signals representing those phrases, the IP would store templates or other pattern information for use in identifying and/or verifying that a caller is the particular subscriber.

During actual call processing, the voice authentication module 233 receives speech information from the caller. The voice authentication module 233 compares the received information to its stored template or feature data to identify a calling party as a particular subscriber.

In the case of speech recognition applied to incoming calls, the IP is trained in a different manner. Current speech recognition technology permits recognition with a reasonable degree of certitude based on training from a limited sample of recorded speech of a subject. In situations where the target of the speech recognition is not such as may participate in the cooperative manner of subscribers, recorded samples of prior telephone speech may be used with available recognition facilities of a more sophisticated nature.

In such situations the present invention also relies on the speech recognition capability of the module 235, particularly in processing of incoming calls in certain situations. The speech recognition module 235 enables the IP to analyze incoming audio information to recognize vocabulary words. The IP interprets the spoken words and phrases to determine subsequent action. For example, the IP might recognize the caller speaking the name of a called subscriber and use the subscriber identification to instruct the terminating central office to control the call in accord with that subscriber's profile.

As previously stated, the preferred form of the invention utilizes AIN type call processing. Typical AIN call processing is illustrated and described in detail in the above referenced related cases and that description and those illustrations are incorporated by reference herein.

Figure 4:
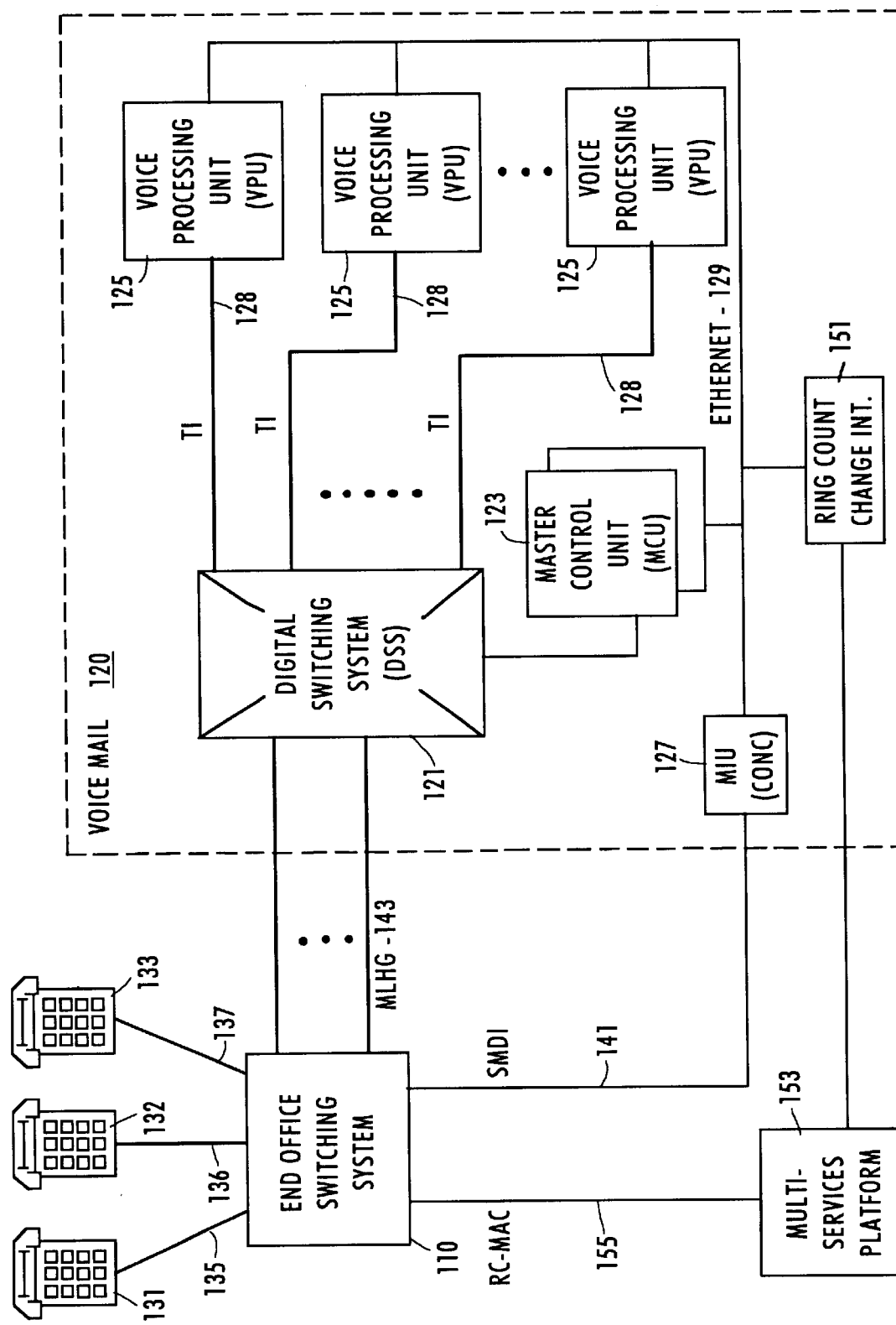
FIG. 4 is a block diagram depicting an example of one voice mail system suitable for use pursuant to one preferred embodiment of the invention.

FIG. 4 provides a block diagram illustration of a typical commercially available voice mail system suitable for serving as any of the voice mail systems shown in FIG. 1. The voice mail system 120 includes a digital switching system (DSS) 121, a master control unit (MCU) 123, a number of voice processing units (VPUs) 125 and a master interface unit (MIU) or concentrator 127. The master control unit (MCU) 123 of the voice mail system 120 is a personal computer type device programmed to control overall operations of the system 120.

Each of the voice processing units 125 also is a personal computer type device. The voice processing units 125 each include or connect to one or more digital mass storage type memory units (not shown) in which the actual messages are stored. The mass storage units, for example, may comprise magnetic disc type memory devices. Although not specifically illustrated in the drawing, the voice processing units 125 also include appropriate circuitry to transmit and receive audio signals via T1 type digital audio lines. An ETHERNET type digital network 129 carries data signals between the MCU 123 and the voice processing units 125. The Ethernet network 129 also carries stored messages, in digital data form, between the various voice processing units 125. The system 120 further includes T1 type digitized audio links 128 between the DSS switch 121 and each of the voice processing units 125.

The voice mail system 120 connects to the switching system 110 via a number of simplified message desk interface (SMDI) type data lines 141. Specifically, these SMDI links 141 connect between one or more data units (not shown) in the end office switching system 110 and the MIU 127 in system 120. Each SMDI line 141 carries 2400 baud RS-232 data signals in both directions between the voice mail system 120 and the switching system 110. The MIU 127 is a data concentrator which effectively provides a single connection of as many as thirty-two SMDI lines into the MCU 123 of the voice mail system.

The voice mail system 120 also connects to the end office switching system 110 via a number of voice lines 143 which form a multi-line hunt group (MLHG) between the switch matrix within the switching system 110 and the DSS switch 121 of the voice mail system 120. Typically, the MLHG lines 143 consist of a number of T1 type trunk circuits which each carry 24 voice channels in digital time division multiplexed format.

The above described voice mail system architecture is similar to existing voice mail type central messaging systems, such as disclosed in U.S. Pat. No. 5,029,199 to Jones et al., although other messaging system architectures such as disclosed in the other patents cited above could be used. See also U.S. Pat. No. 5,661,782 to Farris and Bartholomew for additional description of operation of this type of voice mail system.

For each party who subscribes to a voice mail service provided by the centralized messaging system 120, the MCU 123 stores information designating one of the voice processing units 125 as the "home" unit for that subscriber. Each voice processing unit 125 stores generic elements of prompt messages in a common area of its memory. Personalized elements of prompt messages, for example recorded representations of each subscriber's name spoken in the subscriber's own voice, are stored in designated memory locations within the subscriber's "home" voice processing unit.

In voice mail systems of the type discussed above, a subscriber's "mailbox" does not actually correspond to a particular area of memory. Instead, the messages are stored in each "mailbox" by storing appropriate identification or tag data to identify the subscriber or subscriber's mailbox to which each message corresponds.

Each time a call comes in to the voice mail system 120, the master control unit 123 controls the digital switching system 121 to provide a multiplexed voice channel connection through to one of the voice processing units 125. Typically, the call connection goes to the "home" voice processing unit for the relevant subscriber. The voice mail subscriber is identified by data transmitted from the switching system 110, as described above, if the call is a forwarded call. If all 24 T1 channels to the "home" voice processing unit are engaged, the central processing unit 123 controls switch 121 to route the call to another voice processing unit 125 which is currently available.

The voice processing unit connected to the call retrieves prompt messages and/or previously stored messages from its memory and transmits them back to the calling party via the internal T1 line 128, the DSS switch 121 one of the voice channels, central office switching system 110 and the calling party's telephone line. The voice processing unit 125 connected to the call receives incoming messages from the caller through a similar route and stores those messages in digital form in its associated mass storage device.

When the incoming call is a forwarded call, the connected voice processing unit 125 provides an answering prompt message to the caller, typically including a personalized message recorded by the called subscriber. After the prompt, the voice processing unit 125 records a message from the caller and identifies that stored message as one for the called subscriber's mailbox.

At times the connected voice processing unit 125 will not have all necessary outgoing messages stored within its own associated memory. For example, a forwarded call normally will be connected to the called subscriber's "home" voice processing unit 125, but if the home unit is not available the forwarded call will be connected to a voice processing unit 125 other than the subscriber's home voice processing unit. In such a case, the connected unit 125 requests and receives from the home unit 125 the personalized components of the answering prompt message via the data network 129. The connected voice processing unit 125 will store the transferred message data in its own memory, and when necessary, will play back the transferred data from its own memory as outgoing messages in the exact same manner as for any prompts or greeting messages originally stored in its own memory.

The connected voice processing unit 125 also will store any incoming message in its own associated memory together with data identifying the message as one stored for the called subscriber's mailbox. As a result, the system 120 actually may store a number of messages for any given subscriber or mailbox in several different voice processing units 125. Subsequently, when the voice mail subscriber calls in to the voice mail system 120 to access the subscriber's mailbox, the call is connected to one voice processing unit 125. Again, this call typically goes to the home unit 125 but would go to a different available one of the units 125 if the home unit is not available at the time. In response to appropriate DTMF control signals, or preferably voice signals, received from the subscriber, the connected voice processing unit retrieves the subscriber's messages from its own memory and plays the messages back to the subscriber. If any messages are stored in other voice processing units, the connected unit 125 sends a request the other units 125 to download any messages for the subscriber's mailbox those units have actually stored. The downloaded messages are stored in the memory of the connected voice processing unit 125 which replays them to the subscriber.

Attention is directed to FIG. 1. According to a preferred mode of the invention the typical IPs $IP_A$ and $IP_B$ are supplemented with an adjunct Intelligent Peripheral which is here designated as $IP_C$. $IP_C$ is designed to implement the service of this embodiment of the invention over a relatively wide geographical area in the region of one or more local exchange carrier (LEC) networks. That is, the proprietor of $IP_C$ need not be the local exchange carrier which operates the network or networks in which $CO_A$ and $IP_A$ are found. The primary function of $IP_C$ in this embodiment is to provide a temporary residence and processing host for customer profile data including executable application data and scripts directing use of the applications to emulate voice mail interfaces. This profile and script data is transferred or copied to $IP_C$ from home or local storages, which may be located in a wide geographic area having a telecommunications network connected to $IP_C$, as is later described in further detail.

The involved profiles preferably include the typical switch profile data in addition to a personal profile of the subscriber interface to his home voice mail system. This includes the one or more scripts which define the operation of transferred data. The scripts direct the operation of the host processor in $IP_C$ in interaction with the switch, ISCP, and voice mail system at the remote locale. The IPs $IP_A$ and $IP_C$ are linked by voice and signaling circuits and the scripts are preferably stored in $IP_C$, in which they may be run by the host processor in $IP_C$. The scripts may be accessed and retrieved by $IP_A$ and, if desired, may be run in $IP_A$. While $IP_C$ may comprise an intelligent peripheral of the type illustrated in FIG. 3, it is not necessary that it incorporate modules which will not be used. On the other hand IPs $IP_A$ and $IP_C$ may be combined to perform the functions of both IPs.

The scripting language may be any suitable object oriented language, such as, by way of example, Java Script, Java Command Language (Jacl), or Tcl Blend. JavaScript is a scripting language that was founded by Netscape and carried forward by Sun Microsystems, Inc. Jacl is a one hundred percent Java implementation of the Tcl scripting language of Sun Microsystems, Inc. Tcl Blend is a further Sun adaptation of Java and Tcl. The expressed purpose of so called Sun Script is articulated by its developers as "script once, run anywhere." It is a feature of the invention that its methodology be virtually universally usable across disparate vice mail systems. Java and Java type scripting languages constitute preferred languages for this purpose. Other currently used scripting languages include Perl and Python.

Each of the central offices $CO_A$ and $CO_B$ are connected to a local voice mail system shown as 11 and 12 in FIG. 1. The connection between the voice mail system and switch in the particular embodiment shown in FIG. 1 is via simplified message desk interface (SMDI) and multi-line hunt group (MLHG) lines. In the illustrated embodiment the central office $CO_A$ may be in a different region than the central offices $CO_B$ and $CO_C$. Each central office serves as the end office for terminals shown as terminals L and R served by central office $CO_A$, terminal H served by central office $CO_B$, and terminal X served by central office $CO_C$.

In an illustrative example of the operation of the invention according to one preferred embodiment, telephone terminal H is the home terminal of a customer or subscriber John Doe. John Doe is a personal service subscriber and also subscribes to voice mail service. The voice mail system 11 is his local voice or home mail system, which provides that service using the voice mail system of a specific vendor. Subscriber Doe has a personal interface to that system which is defined by the software provided by that system. The interface includes generic elements of prompt messages as well as personalized elements of prompt messages. For example the interface includes recorded representations of each subscriber's name spoken in the subscriber's own voice, and personalized messages recorded by the subscriber. These elements are stored in designated memory locations in the voice mail system as previously described in relation to the voice mail system of FIG. 4. Related script and executable applications for reproducing or emulating the operation of the interface are stored in storage in $IP_B$ associated with Doe's end office $CO_B$. The applications are derived or copied from applications existing in disk storage in the local or home voice mail system 11. The script provides direction for the execution of the applications in interfacing with remote voice mail systems.

In the situation of this example it is assumed that Doe has traveled to a remote city where he expects to remain at the residence of a friend for a period of time. Being a subscriber to personal dial tone service and to voice mail, and possibly other services, he desires his personal service to be available at the line serving the customer premises of the friend with whom he will be staying. The set up procedure for making personal dial tone service available at a remote second subscriber line is described in detail in copending application Ser. No. 09/006,033 filed Jan. 12, 1998 which is incorporated herein in its entirety by reference. That procedure may be summarized as follows.

To activate the personal dial tone service at the remote locale, Doe uses the telephone terminal R and dials the access telephone number assigned to that service. Responsive to that call the customer profile record data, executable application data, and related script data are transferred to the switching system central office $CO_A$ and associated equipment at that locale. This includes voice mail system 12, $IP_A$, and $IP_C$, and voice mail system 12. The data to be transported is transferred from $CO_B$, $IP_B$, and voice mail system 11 via the TCP/IP network to $IP_A$, the switch at $CO_A$, and $IP_C$. As an alternative to collecting the data to be transferred from these multiple sources it is also a feature of the invention that such data may be stored in memory at $IP_B$. As described in detail in above mentioned related application Ser. No. 09/006,033 filed Jan. 12, 1998 the voice templates, related profile data, executables and script are stored in the SIV capable $IP_A$, switch $CO_A$, and $IP_C$. The customer profile record (CPR) is stored in the administrative module of the switch in $CO_A$ where it is identified by its assigned virtual OE number. The script and executables for the voice mail service are stored in the $IP_C$ and, in certain instances, at least partially in the voice mail system 12.

When Doe wishes to access his voice mail messages from the remote line to telephone terminal or station R, he goes off hook at R. Pursuant to the prior transfer of the profile, script and executable data in response to Doe's request, and pursuant to customer profile record data regarding Doe stored in the ISCP, an off-hook originating trigger has been set in the switch in central office $CO_A$ against the line to telephone terminal R. When Doe goes off hook at terminal R the trigger is actuated and an inquiry is sent from the $CO_A$ SSP to the ISCP. The ISCP accesses its database and retrieves data which includes information necessary for routing the call to some node of the network that will perform speaker identification/verification (SIV).

In the preferred embodiment, the SIV is a function performed by an Intelligent Peripheral (IP), therefore the CPR provides information for routing the call to the nearest available IP having SIV capability. In FIG. 1 this constitutes $IP_A$. The ISCP returns an appropriate response message to the SSP and the call is connected to $IP_A$. The communication link to $IP_A$ provides both line and signaling connections, preferably over a primary rate interface (PRI) type ISDN link. When the central office $CO_A$ extends the call from the calling party's line to a line circuit (over a B channel) to the $IP_A$, the switch in that office also provides call related data over the signaling link (D channel for ISDN). The IP and ISCP exchange information over the 1129+ link and the IP provides voice identification.

The preferred implementation utilizes a 'Challenge Phase' to prompt the user to input specific identifying information. In this case, the instruction causes $IP_A$ to provide a prompt message over the connection to the caller. Preferably, the instruction from the ISCP causes the IP to provide an audio announcement prompting the caller to speak personal information, such as, 'Please say your full name'. The IP thereupon uses the templates and data transferred in response to Doe's request for personal dial tone service during the period of his stay at terminal R.

Following establishment of a match, i.e. authentication of the caller as Doe, the $IP_A$ selects from storage the virtual office equipment (OE) number that corresponds to subscriber Doe. $IP_A$ formulates a D-channel signaling message containing the virtual office equipment (OE) number together with an instruction to load that virtual OE number into the register assigned to the call in place of the OE number of the off-hook subscriber line R. In response, the administrative module processor 61 rewrites the OE number in the register assigned to the call using the virtual OE number received from the IP. The administrative module processor 61 of central office switch $CO_A$ also reloads the profile information in the register. Specifically, the administrative module processor 61 retrieves profile information associated with the virtual office equipment (OE) number from the disc storage 63 and loads that profile data into the register. As such, the profile information in the assigned register in the call store 67 now corresponds to the identified customer John Doe, rather than to the off-hook line to terminal R.

In the presently preferred implementation, when the central office switch $CO_A$ reloads the profile, the central office disconnects the link to $IP_A$ and connects tone receivers to the caller's line. Optionally, the central office may provide a 'dial tone' or other message over the line. The caller Doe now dials his 1-800-NXX-XXXX voice mail access number in the normal manner. The switch in the central office $CO_A$, upon receiving the dialed 1-800 voice mail access number, and knowing the identity of the caller and his virtual EO profile, queries the ISCP for routing directions. The ISCP keys on the combination of the dialing of the 1-800 voice mail message access number and the virtual EO of the identified caller. In response it replies to the SSP and directs the SSP to send the call to $IP_C$, in which all of the scripts are stored, as previously described. $IP_C$ is connected to $IP_A$, also as previously described, and is also connected to the ISCP. The ISCP and all IPs thus share information. At this point the outstanding question is the query to the ISCP seeking direction as to where to forward the voice mail message retrieval request.

Further description of the retrieval of Doe's voice mail messages from terminal R is best preceded by a discussion of the considerations involved in the methodology of storage of Doe's voice mail messages which are to be retrieved. Depending on how the subscriber elects to define his individual service, in a typical example the network may route calls to roamer Doe at station R. Such a call would be routed as a normal AIN forwarded call that simply rings the station R on the line having the OE number. On encountering a busy or no answer situation at terminal R, voice mail service is actuated. The invention comprehends that the voice messaging system which is utilized for responding to busy or no answer calls and for storage of messages may be either the voice mail system 11 at the Doe's home locale or the voice mail system 12 at the roaming or remote locale.

In the case of use of the home voice mail system 11, the busy no answer common channel signaling message that is returned to the central office $CO_B$ results in normal operation of home voice mail system 11 to store a caller's message in its storage. Such messages may then be retrieved by any of a number of methods. In one method the retrieving roamer Doe at station R is connected to voice mail system 11 by trunk connection to central office $CO_B$. The stored message is delivered over the trunk to central office $CO_A$ and thence to Doe at station R. However this method entails toll charges.

Another method of using the home voice mail system 11 for initial storage of messages entails periodic data transfer of stored messages from the storage of home voice mail system 11 to the storage of voice mail system 12. The transfer may be via the common channel signaling links as described in the common assignee's U.S. Pat. No. 5,680, 442, which is incorporated herein by reference in its entirety. Alternately, the transfer may be accomplished via the trunk circuits as compressed voice. Still a further alternative is transfer via the TCP/IP network. Following the transfer the roamer then retrieves the message locally at the roaming locale.

An alternative and presently preferred method entails storage of the messages in the remote voice mail system 12 in the initial instance. Yet another option is storage of the messages for the roamer John Doe in the $IP_C$ where the profile script is stored. In both of these options the invention involves transfer to the roaming or remote locale of the profile of the home or local voice mail system 11, so that the roamer may utilize the voice mail interface to which he is accustomed. According to the invention this voice mail interface is transferred by transfer of the profile, script, executables, and related data to $IP_C$. This transfer occurs responsive to the previously described roamer's request that his enhanced services be made available at station R.

By way of example, assume a call for John Doe from a caller at station L in the remote locale. The caller at station L dials the 10 digit for the phone number of John Doe at his home station H. The prior transfer and activation of Doe's personal dial tone service with roaming voice mail to terminal R, at the request of Doe, resulted in setting the home or local switch $CO_B$ to forward such a call to the designated remote station R. It is delivered to that station as a personalized call with distinctive ringing, as previously described. The identification of Doe as the called party results in the profile of Doe's virtual OE to be installed in the switch $CO_A$ at the remote locale. This profile indicates that Doe has voice mail and sets the switch in $CO_A$ to forward to voice mail calls for Doe that result in a busy or no answer situation at the remote locale, namely the line to station R.

As previously stated, an incoming voice message may be stored in $IP_C$ as a function of that intelligent peripheral. Alternatively $IP_C$ may include a voice mail system as previously described with respect to the intelligent peripheral illustrated in FIG. 3. As a still further alternative, the voice mail system may be independent, as illustrated by voice mail system 12 in FIG. 1. Whichever of these alternative architectures is used, the transfer of the personal profile and script of John Doe to the remote locale results in $IP_C$ running the script and adjusting the personal profile to include the correct instructions for the handling of voice mail.

This includes identification of the address of the voice mail system or storage to which the call is to be forwarded. It also includes installation of the personal voice mail interface of John Doe in the remote system. If the voice mail system which is utilized is the independent voice mail system 12, a dynamic or guest mail box is established pursuant to the script and to the switch translations in the switch in $CO_A$. Voice mail system 12 is the voice mail system associated with the central office $CO_A$. The voice mail interface of John Doe at his home voice mail system 11 has been transferred or transported to the remote locale and remote voice mail system 12. The same procedure is utilized in the case where the voice mail system is included in $IP_C$, if that option is elected. In both cases the remote voice mail system is provided with the same personalized prompts and features which Doe has in his home voice mail service.

As a still further alternative to the above described methods of storing voice mail messages, it is a further feature of the invention that the decision as to where message storage is to occur may be made dynamically on a call by call basis. In the foregoing examples message storage has been in the remote locale, i.e. voice mail system 12, so that retrieval does not require connection with the home voice mail system 11.

According to another feature of the invention a decision as to which voice mail system is to be used for message storage is made dynamically at the time that the busy no answer condition is detected. When the initial common channel signaling routine is performed to determine if the line to station R is busy to an incoming personal dial tone call (distinctive ringing), a point in call (PIC) occurs. A terminating attempt trigger (TAT) has been set pursuant to the Doe profile having been loaded in the switch at $CO_A$. The profile matching the virtual OE number has been loaded and the SSP queries the ISCP. This signaling poses to the ISCP the question of a call encountering a busy signal at station R at the remote locale by a call from an originating line which is a specific NPA/NXX XXXX. The NPA NXX XXXX provides an indication of the location of the calling party. The signaling requests direction as to where to forward the voice mail.

By way of example, the incoming call may be from station L, which is proximate to the remote voice mail system 12, or it may be from the station X, which is proximate to the home voice mail system. The ISCP is provided with a conventional rater which consults least cost routing tables to determine the least expensive and most preferred manner of handling the situation. Dependent upon that decision by the ISCP, the voice mail transaction is made either with the home voice mail system 11 or the remote voice mail system 12.

Attention is now directed back to the description of the accessing of stored voice mail messages by the roamer Doe at the remote station R. Continuing that discussion, the ISCP has keyed on the combination of Doe's dialing of the voice mail message access number from station R, using the virtual EO of the SIV identified caller. The ISCP responds to the inquiry message by directing the SSP to send the message access call to $IP_C$. In the embodiment in which the voice messages are stored in a voice mail system within $IP_C$, one of the options which has been described above, the $IP_C$ provides a voice grade and signal connection to the internal voice mail system. The signaling connection is made over the second signaling network and instructs the processor in $IP_C$ to run the transferred profile applications pursuant to the transferred script relating to roamer Doe. The script and pertinent applications in $IP_C$ are thereupon run to emulate the voice mail interface of Doe, and Doe is able to retrieve his messages from the remote voice mail system 12 in the same manner as would occur if Doe were at his home locale. Thus Doe has the convenience of retrieving his voice mail messages without the necessity of learning to deal with the interface of a remote voice mail system of a different vendor or manufacturer.

In the embodiment in which the voice mail messages are stored in the remote voice mail system 12 and the profile corresponding to the virtual OE of Doe is loaded into the switch at $CO_A$, following speech processing to identify Doe, the ISCP sends the call to the $IP_C$ but does not set up a voice connection to $IP_C$. The message from the ISCP informs $IP_C$ that voice mail system 12 is the voice mail system in use. The $IP_C$ runs the appropriate script and executables to effectively transfer to the voice mail system 12 the interface for Doe's home voice mail system 11. Pursuant to the establishment of that interface, the IP also instructs the SSP of $CO_A$ to make a voice connection from Doe at station R to the voice mail system 12. The voice mail system 12 responds to the running of the Doe interface transferred from $IP_C$, and Doe accesses him voice mail messages in the same manner as if at home accessing the local voice mail system 11.

In the embodiment wherein the voice mail messages of Doe have been stored in his home voice mail system 11, the ISCP directs the SSP of $CO_A$ to direct the call to the home voice mail system 11, where the request for access to voice mail messages is handled in the same manner as when Doe accesses the voice mail system 11 from his home station H. In the event that the voice mail storage is handled dynamically to choose storage at the home voice mail system 11 or the remote voice mail system 12 on the basis of a least cost look-up, the access request proceeds in the same manner as described above for accessing voice mail system 11 or voice mail system 12.

It will be appreciated that the invention implements not only roaming voice mail service for the roaming subscriber while using his personal voice mail interface, but also permits the roamer to use the line of a remote customer or subscriber without changing the OE or the use of that line by the remote subscriber. The roaming party is assigned a virtual OE number and is able to enjoy his personal dial tone service in the remote locale.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method, comprising:

detecting a request to retrieve stored voice mail messages in a communication network including multiple voice mail systems;

receiving and processing speech signals from a person via the communication network to identify the person as a specific roaming subscriber;

instructing a switching office of the communication network to utilize profile data corresponding to the identified roaming subscriber for processing of the request; and instructing one of the voice mail systems to utilize a specified voice mail system interface other than its installed interface, and providing data to cause implementation of said specified voice mail interface based at least in part on said profile data, wherein:

(a) said profile data corresponding to the identified roaming subscriber is transferred from a home locale of said roaming subscriber prior to the processing of said request, (b) said specified voice mail system interface is transferred from a home locale of said roaming subscriber prior to the processing of said request, (c) the implementation of the specified voice mail interface uses a script stored in a mass storage having processor means associated therewith for running executable applications associated with said script and stored in said mass storage, and (d) said processor means comprises a peripheral connected to said switching office and to a switching control point in a common channel interoffice signaling network controlling said communication network.

2. A method according to claim 1, wherein said receiving and processing of speech signals is implemented in another peripheral connected to said switching office and connected to said switching control point.

3. A method comprising:

responsive to a request from an identified subscriber of a communication network including multiple switching systems and multiple voice mail systems associated with said switching systems, transferring from first mass storage connected to a first of said switching systems to second mass storage connected to a second of said switching systems a customer profile record and associated object oriented script and data for said identified subscriber;

instructing said first switching system to forward calls for said identified subscriber to an identified subscriber line of a second subscriber of said communication network connected to said second switching system;

responsive to encountering a busy or no answer condition in a forwarded call, storing a voice mail message in a voice mail system connected to said second switching system;

detecting a request to said second switching system to retrieve said stored voice mail message;

receiving and processing signals from the requesting person to identify the requesting person as said identified subscriber;

instructing said second switching office to utilize said customer profile data for said identified subscriber for processing of said request; and instructing said voice mail system connected to said second switching system to utilize a specified voice mail system interface other than its installed interface, and providing data to cause implementation of said specified voice mail interface based at least in part on one or more of said customer profile records, object oriented script, and data.

4. A method according to claim 3 wherein said processed signals comprise speech signals.

5. A method according to claim 4 wherein said speech processing is performed by a first peripheral connected to said second switching system.

6. A method according to claim 5 wherein said second voice mail system is associated with a second peripheral, said scripts being stored in a storage associated with said second intelligent peripheral.

7. A method according to claim 6 wherein said customer profile record is identified by a virtual office equipment number.

8. A method according to claim 7 wherein said subscriber line of said second subscriber has an office equipment number in said second switching system.

9. A method according to claim 3 wherein said second mass storage includes processor means associated therewith for running executable applications associated with said script and stored in said second mass storage.

10. A method according to claim 9 wherein said processor means comprises a peripheral connected to said second switching system and to a switching control point in a common channel interoffice signaling network controlling said communication network.

11. A method comprising:

storing a customer profile record and associated script at a first locale, said customer profile record and said script being associated with a first switching system serving a first user terminal, and with a first voice mail system interface;

transferring a voice mail system interface to a second locale, the step of transferring comprising transferring said customer profile record and said script to the second locale, whereby said customer profile record and script are associated with a second switching system serving a second user terminal, and a second voice mail system at said second locale;

forwarding calls for the customer associated with said customer profile record to said second switching system directed to said customer at second terminal; and providing voice mail service including retrieval of stored voice mail messages to said customer at said second user terminal based on the transferred customer profile record using the transferred script, so as to implement said voice mail system interface.

12. A method according to claim 11 wherein said retrieval is conditioned on prior identification of the retrieving party as said customer with whom said customer profile record is associated.

13. A method according to claim 12 wherein said identification of said retrieving party is by speech processing.

14. A method according to claim 13 wherein said speech processing is at a node at said second locale.

15. A method according to claim 14 wherein said speech processing is performed by a first peripheral connected to said second switching system.

16. A method according to claim 15 wherein said second voice mail system is associated with a second peripheral, said script being stored in a storage associated with said second peripheral.

17. A method according to claim 11, wherein the step of transferring the voice mail system interface to the second locale further comprises transferring interface data for the customer.

18. A method comprising:
storing a customer profile record and associated script at a first locale, said customer profile record and said script being associated with a first switching system serving a first user terminal, and with a first voice mail system interface;
transferring said customer profile record, script and voice mail system interface to a second locale, whereby said customer profile record, script and voice mail system interface are associated with a second switching system serving a second user terminal, and a second voice mail system at said second locale;
forwarding calls for the customer associated with said customer profile record to said second switching system directed to said customer at second terminal; and
providing voice mail service including retrieval of stored voice mail messages to said customer at said second user terminal using said voice mail system interface, wherein said voice mail messages are stored by said second voice mail system.

19. A method according to claim 18 wherein said speech processing is performed by a first peripheral connected to said second switching system.

20. A method according to claim 19 wherein said scripts are stored in a storage associated with a second peripheral for running said scripts.

21. A method comprising:
storing a customer profile record and related object oriented script for a first customer of a telecommunications system at a first locale, said customer profile record and said script being associated with a first switching system serving a first user terminal line, and with a first voice mail system interface;
transferring said customer profile record and said script to a second locale, where said customer profile record and said script are associated with a second switching system serving a second user terminal line, and a second voice mail system at said second locale;
forwarding calls for said first customer to said second switching system directed to said first customer at said second user terminal line;
providing voice mail service for said first customer at said second user terminal using said voice mail system interface based at least in part on the transferred profile;
dialing a voice mail retrieval access number on said second user terminal line;
identifying the dialing party as said first customer and associating said first voice mail system interface with said second voice mail system; and
providing retrieval of stored voice mail messages to said first customer on said second user terminal line in accord with said first voice mail system interface using the transferred script.

22. A method according to claim 21 wherein said identification of said dialing party is by speech processing.

23. A method according to claim 21, wherein the step of transferring also transfers interface data for the first customer.

24. A method, comprising:
storing a customer profile record and related object oriented script for a first customer of a telecommunications system at a first locale, said customer profile record and said script being associated with a first switching system serving a first user terminal line, and with a first voice mail system interface;
transferring said customer profile record, script and voice mail system interface to a second locale, where said customer profile record, script and voice mail system interface are associated with a second switching system serving a second user terminal line, and a second voice mail system at said second locale;
forwarding calls for said first customer to said second switching system directed to said first customer at said second user terminal line;
providing voice mail service to said first customer at said second user terminal using said voice mail system interface;
dialing a voice mail retrieval access number on said second user terminal line;
identifying the dialing party as said first customer and associating said first voice mail system interface with said second voice mail system; and
providing retrieval of stored voice mail messages to said first customer on said second user terminal line using said first voice mail system interface,
wherein said associating said first voice mail system interface with said second voice mail system is controlled at least partially by said transferred customer profile record and associated script for said first customer.

25. A method according to claim 24 wherein said customer profile record is identified by a virtual office equipment number.

26. A method, comprising:
storing a customer profile record and related object oriented script for a first customer of a telecommunications system at a first locale, said customer profile record and said script being associated with a first switching system serving a first user terminal line, and with a first voice mail system interface;
transferring said customer profile record, script and voice mail system interface to a second locale, where said customer profile record, script and voice mail system interface are associated with a second switching system serving a second user terminal line, and a second voice mail system at said second locale;
forwarding calls for said first customer to said second switching system directed to said first customer at said second user terminal line;
providing voice mail service to said first customer at said second user terminal using said voice mail system interface;
dialing a voice mail retrieval access number on said second user terminal line;
identifying the dialing party as said first customer and associating said first voice mail system interface with said second voice mail system; and providing retrieval of stored voice mail messages to said first customer on said second user terminal line using said first voice mail system interface, wherein said second user terminal line has an office equipment number in said second switching system and said customer profile record for said first customer has a virtual office equipment number.

27. A method according to claim 26 wherein said office equipment number for said second user terminal line identifies a customer profile record for that line, and wherein said virtual office equipment number identifies the customer profile record for said first customer.

28. A method according to claim 27 wherein said office equipment number for said second user terminal line and the associated customer profile record constitutes a default customer profile record for that line, said default customer profile record being replaced with said customer profile record for said first customer following said identification of said first customer.

29. A method, comprising:
detecting a request to retrieve stored voice mail messages in a communication network including multiple voice mail systems;
receiving and processing speech signals from a person via the communication network to identify the person as a specific roaming subscriber;
instructing a switching office of the communication network to utilize profile data corresponding to the identified roaming subscriber for processing of said request; and
instructing one of said voice mail systems to utilize a specified voice mail system interface other than its installed interface, and providing data to cause implementation of said specified voice mail interface based at least in part on said profile data,
wherein the step of instructing and providing comprises downloading an object oriented script related to the profile data, to the one voice mail system.

30. A method, comprising:
detecting a request to retrieve stored voice mail messages in a communication network including multiple voice mail systems;
receiving and processing speech signals from a person via the communication network to identify the person as a specific roaming subscriber;
instructing a switching office of the communication network to utilize profile data corresponding to the identified roaming subscriber for processing of said request; and
instructing one of said voice mail systems to utilize a specified voice mail system interface other than its installed interface, and providing data to cause implementation of said specified voice mail interface based at least in part on said profile data, wherein:
the step of instructing and providing comprises downloading an object oriented script related to the profile data, to the one voice mail system, and
said profile data corresponding to the identified roaming subscriber is transferred from a home locale of said roaming subscriber prior to the processing of said request.

31. A method according to claim 30 wherein said specified voice mail system interface is transferred from a home locale of said roaming subscriber prior to the processing of said request.

32. A method, comprising:
detecting a request to retrieve stored voice mail messages in a communication network including multiple voice mail systems;
receiving and processing speech signals from a person via the communication network to identify the person as a specific roaming subscriber;
instructing a switching office of the communication network to utilize profile data corresponding to the identified roaming subscriber for processing of said request; and
instructing one of said voice mail systems to utilize a specified voice mail system interface other than its installed interface, and providing data to cause implementation of said specified voice mail interface based at least in part on said profile data, wherein:
the step of instructing and providing comprises downloading an object oriented script related to the profile data, to the one voice mail system, and
said script is stored in a mass storage having processor means associated therewith for running executable applications associated with said script and stored in said mass storage.

33. A method, comprising:
identifying one party to a requested communication service as one of a plurality of subscribers;
using a virtual office equipment number, assigned to the identified one subscriber, to retrieve corresponding profile data from stored profile data for the plurality of subscribers;
retrieving from a mass storage of service control scripts a script assigned to the subscriber to which the virtual office equipment number is assigned;
retrieving from a first service providing system data defining a user interface to the first service providing system for the subscriber to which the virtual office equipment number is assigned;
transferring to remote storage the retrieved profile data, the retrieved script, and the retrieved interface data; and
providing service to the subscriber to which the virtual office equipment number is assigned from a second service providing system based at least in part on the transferred profile data, script, and interface data, wherein
said first and second service providing systems comprise voice mail systems.

34. A method according to claim 33 wherein said user interface comprises an interface to said voice mail systems used by said subscriber to which said virtual office equipment number is assigned.

35. A method according to claim 34 wherein said interface is personal to said subscriber.

36. A method, comprising:
identifying one party to a requested communication service as one of a plurality of subscribers;
using a virtual office equipment number, assigned to the identified one subscriber, to retrieve corresponding profile data from stored profile data for the plurality of subscribers;
retrieving from a mass storage of service control scripts a script assigned to the subscriber to which the virtual office equipment number is assigned;
retrieving from a first service providing system data defining a user interface to the first service providing system for the subscriber to which the virtual office equipment number is assigned;

transferring to remote storage the retrieved profile data, the retrieved script, and the retrieved interface data; and providing service to the subscriber to which the virtual office equipment number is assigned from a second service providing system based at least in part on the transferred profile data, script, and interface data, wherein:
- said first and second service providing systems comprise voice mail systems,
- said user interface comprises an interface to said voice mail systems used by said subscriber to which said virtual office equipment number is assigned
- said interface is personal to said subscriber, and
- said interface provides substantially the same subscriber prepared voice prompts in said first and second voice mail systems.

37. A method according to claim 36 wherein said interface provides substantially the same message retrieval prompts in said first and second voice mail systems.

38. A method, comprising:

identifying one party to a requested communication service as one of a plurality of subscribers;

using an identification device, assigned to the identified one subscriber, to retrieve corresponding profile data from stored profile data for the plurality of subscribers;

retrieving from a mass storage of service control scripts a script assigned to the subscriber to which said identification device is assigned;

retrieving from a first service providing system data defining a user interface to said first service providing system for said subscriber to which said identification device is assigned;

transferring to remote storage the retrieved profile data, script, and interface defining data; and providing service to the subscriber to which said identification device is assigned from a second service providing system based at least in part on the transferred profile data, script, and interface data.

39. A communication network comprising:

first and second central office switching systems connected by trunks and having first and second voice mail systems, respectively, the first central office switching system having first storages containing subscriber profiles, and the second central office switching system having second storages containing subscriber profiles;

each of said voice mail systems having subscriber interfaces including system voice prompts and subscriber created voice prompts, said first voice mail system having a storage associated therewith and data stored in said storage for executing the interface of said first voice mail system;

said second voice mail system having a storage associated therewith and data stored in said storage for executing the interface of said second voice mail system; and first and second peripherals having storages for object oriented script and coupled to said first and second central offices;

wherein the profile, script, and interface executing data of an identified subscriber is transferred from first storages associated with said first central office switching system, peripheral and voice mail system to second storages associated with said second central office switching system, peripheral and voice mail system to provide to said identified subscriber from said second voice mail system voice mail service using the interface of said identified subscriber in said first voice mail system.

40. A communication network according to claim 39 wherein the central office switching systems comprise telephone switches.

41. A communication network according to claim 40 further comprising:

a service control point, remote from the central office switching systems, said service control point containing a database of call processing records for controlling at least some services provided through the central office switching systems; and a first signaling network separate from the trunks for carrying signaling messages between the service control point and the central office switching systems.

42. A communication network according to claim 41, further comprising a second signaling network, separate from the trunks and the first signaling network coupled between each peripheral and the service control point.

43. A communication network according to claim 42 wherein said voice mail service provided to said identified subscriber from said second voice mail system includes retrieval of stored voice mail messages following identification of said identified subscriber.

44. A communication network according to claim 43, further comprising a speech processing node, said identification of said subscriber being implemented by speech processing.

45. A communication network according to claim 44, further comprising a third peripheral including said speech processing node, said third peripheral being connected by said second signaling network to said service control point.

* * * * *